US007489683B2

(12) United States Patent
Navada et al.

(10) Patent No.: US 7,489,683 B2
(45) Date of Patent: Feb. 10, 2009

(54) INTEGRATED CIRCUIT CAPABLE OF ROUTING MULTICAST DATA PACKETS USING DEVICE VECTORS

(75) Inventors: Muraleedhara Herur Navada, Santa Clara, CA (US); Hitesh Rastogi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 10/953,083

(22) Filed: Sep. 29, 2004

(65) Prior Publication Data

US 2006/0072571 A1   Apr. 6, 2006

(51) Int. Cl.
*H04L 12/28* (2006.01)
*H04L 12/56* (2006.01)
*H04J 3/26* (2006.01)

(52) U.S. Cl. ............... 370/390; 370/392; 370/428; 370/432

(58) Field of Classification Search ............... None
See application file for complete search history.

(56) References Cited

U.S. PATENT DOCUMENTS

| 5,835,537 | A | 11/1998 | Ichii et al. |
| 5,872,904 | A * | 2/1999 | McMillen et al. ............... 714/4 |
| 5,999,531 | A * | 12/1999 | Ferolito et al. ............... 370/390 |
| 6,049,542 | A * | 4/2000 | Prasad ............... 370/386 |
| 6,353,612 | B1 | 3/2002 | Zhu et al. |
| 6,366,563 | B1 | 4/2002 | Weldon et al. |
| 6,460,088 | B1 | 10/2002 | Merchant |
| 6,484,209 | B1 * | 11/2002 | Momirov ............... 709/238 |
| 6,603,772 | B1 * | 8/2003 | Moussavi et al. ............... 370/432 |
| 6,643,294 | B1 * | 11/2003 | Cooperman et al. ......... 370/413 |
| 6,717,914 | B1 | 4/2004 | Hamami |
| 6,778,547 | B1 | 8/2004 | Merchant |
| 6,813,268 | B1 * | 11/2004 | Kalkunte et al. ............ 370/392 |
| 6,988,170 | B2 | 1/2006 | Barroso et al. |
| 7,027,437 | B1 | 4/2006 | Merchant et al. |
| 7,058,053 | B1 * | 6/2006 | Schober ............... 370/390 |
| 7,230,949 | B2 | 6/2007 | Bharali, et al. |

(Continued)

FOREIGN PATENT DOCUMENTS

WO        0115393   A1   3/2001

(Continued)

OTHER PUBLICATIONS

Search Copy: Dated Dec. 6, 2005: PCT/US2005/035416, 1 pg.

(Continued)

*Primary Examiner*—Wing F Chan
*Assistant Examiner*—Hicham B Foud
(74) *Attorney, Agent, or Firm*—Grossman, Tucker, Perreault & Pfleger, PLLC

(57) ABSTRACT

The present disclosure relates generally to an integrated circuit configured to route multicast data packets using device vectors. A method according to one embodiment may include communicating with an external device using port. The method may also include storing a multicast data packet and a master device vector in memory. The method may also include de-queueing the master device vector from memory, generating an additional device vector based on the master device vector, and transmitting the multicast data packet and an additional device vector to an external device via a port. Of course, many alternatives, variations, and modifications are possible without departing from this embodiment.

18 Claims, 8 Drawing Sheets

U.S. PATENT DOCUMENTS

| | | | |
|---|---|---|---|
| 7,277,426 | B2 | 10/2007 | Brown |
| 2002/0126669 | A1* | 9/2002 | Tuck et al. ................. 370/390 |
| 2003/0048785 | A1 | 3/2003 | Calvignac et al. |
| 2003/0174725 | A1* | 9/2003 | Shankar ..................... 370/428 |
| 2003/0231631 | A1 | 12/2003 | Pullela |
| 2004/0008711 | A1 | 1/2004 | Lahti et al. |
| 2004/0022245 | A1 | 2/2004 | Forbes et al. |
| 2004/0156383 | A1* | 8/2004 | Nakagawa et al. .......... 370/432 |
| 2005/0141502 | A1* | 6/2005 | Kumar et al. ............... 370/390 |
| 2006/0069805 | A1 | 3/2006 | LeBlanc, et al. |
| 2006/0146723 | A1 | 7/2006 | Navada et al. |

FOREIGN PATENT DOCUMENTS

| | | | |
|---|---|---|---|
| WO | 02093836 | A1 | 11/2002 |
| WO | 2006039620 | A1 | 4/2006 |

OTHER PUBLICATIONS

IEEE Std 802.3, Mar. 8, 2002, Revision of IEEE, STD 802.3, 2000 Edition, 802.3: IEEE Standard for Information Technology—Telecommunications and information exchange between systems—Local and metropolitan area networks—Specific requirements, Part 3: Carrier Sense Multiple Access with Collision Detection (CSMA/DC) Access Method and Physical Layer Specifications, 11 pgs.

The ATM Forum Technical Committee, ATM-MPLS Network Interworking, Version 1.0, 23 pgs., Aug. 2001.

Boivie, R., et al. "Explicit Multicast (XCAST) Basic Specification". http:http://www.watersprings.org/pub/id/draft-ooms-xcast-basic-spec-05.txt , 1 page., Aug. 2003.

Non-Final Office Action for U.S. Appl. No. 11/027,857 mailed Nov. 1, 2007. 15 Pages.

Office Action Received for U.S. Appl. No. 11/027,857 mailed Jul. 14, 2008. pp. 9.

International Search Report or Written Opinion for PCT Patent Application No. PCT/US2005/035416, mailed on Feb. 21, 2006. pp. 11.

International Preliminary Report on Patentability for PCT Patent Application No. PCT/US2005/035416, mailed on Apr. 12, 2007. pp. 7.

* cited by examiner

DRAT OF DEVICE 3 — 140

| DEV NUM | WAY 0 | WAY 1 | WAY 2 | WAY 3 | WAY 4 | WAY 5 | WAY 6 | WAY 7 | WAY 8 | WAY 9 | WAY 10 | WAY 11 |
|---|---|---|---|---|---|---|---|---|---|---|---|---|
| 0 |   |   |   |   |   |   |   |   |   |   |   |   |
| 1 | 4 | 4 | 4 | 4 | 4 | 4 | 4 | 4 | 4 | 4 | 4 | 4 |
| 2 | 5 | 5 | 5 | 5 | 5 | 5 | 6 | 6 | 6 | 6 | 6 | 6 |
| 3 |   |   |   |   |   |   |   |   |   |   |   |   |
| 4 | 5 | 5 | 5 | 5 | 5 | 5 | 6 | 6 | 6 | 6 | 6 | 6 |
| 5 | 4 | 4 | 4 | 4 | 4 | 4 | 4 | 4 | 4 | 4 | 5 | 6 |
| 6 |   |   |   |   |   |   |   |   |   |   |   |   |
| 7 |   |   |   |   |   |   |   |   |   |   |   |   |
| 8 | 4 | 4 | 4 | 4 | 4 | 4 | 4 | 4 | 4 | 4 | 5 | 6 |

302 — DEV NUM; 304 — STACKED PORT NUMBER; 306, 308 — columns indicated

FIG. 3

INTEGRATED CIRCUIT CAPABLE OF ROUTING MULTICAST DATA PACKETS USING DEVICE VECTORS

FIELD

The present disclosure relates to an integrated circuit capable routing multicast data packets using device vectors.

BACKGROUND

In one conventional network arrangement, a switch is used to permit communication and data exchange between other switches and computer nodes coupled to the switch. The switch may have a plurality of ports, each port coupled to a switch or more computer nodes. Arriving packets are routed to one or more ports via a routing mechanism. Multiple switches may be stacked together to provide additional network connectivity for additional computer nodes. In some instances, one or more packets may be designated to multiple ports, including ports across one or more switches. In the conventional data storage arrangement, each instance of the packet designated for multiple ports must be replicated in memory and transported to the designated ports. The conventional network arrangement is incapable of efficiently handling packets designated for multiple ports. Also, in the conventional network arrangement, routing information for each replication of the data packet must be stored in memory, which may consume vast memory resources. The conventional network arrangement is incapable of supplying routing information for packets designated for multiple ports without consuming memory resources.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3 is a diagram illustrating an exemplary device reachability table according to one embodiment;

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
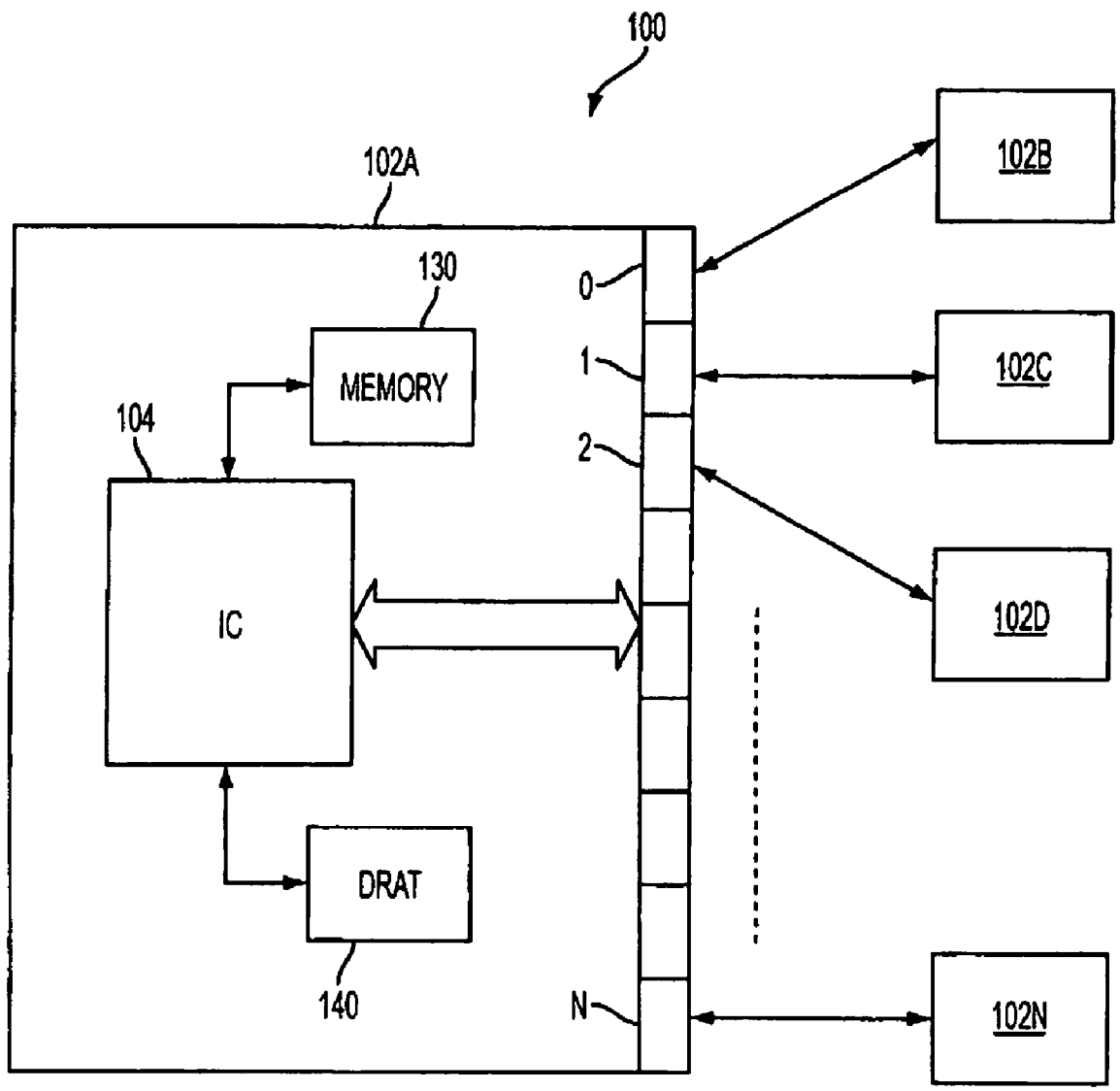
FIG. 1 is a diagram illustrating a system embodiment.

FIG. 1 illustrates a system embodiment 100 of the claimed subject matter. The system 100 may generally include a switch 102A, which may be capable of communicating with one or more external devices, designated as 102B, 102C, 102D . . . 102N. A "device" or "devices", as used in any embodiment herein, may comprise, singly or in combination, for example, a switch, a router and/or a computer node element. It should be noted at the outset that the following detailed description shall proceed with reference to switch 102A, it may be assumed that if devices 102B, 102C, 102D . . . 102N each comprise one or more switches in communication with switch 102A, then these devices may operate in a similar manner as switch 102A. Switch 102A may also be capable of communicating with one or more network node elements, for example, computer node elements (not shown). The term "switch" (e.g., switch 102A), as used in any embodiment herein, may be defined as a device capable of receiving one or more data packets from one or more devices and/or transmitting one or more data packets to one or more devices.

Switch 102A may comprise an enclosure that includes an integrated circuit 104, memory 130, a device reachability table (DRAT) 140 and a plurality of ports 0, 1, 2, . . . , N, the details of which will be provided more fully below. As used in any embodiment herein, an "integrated circuit" means a semiconductor device and/or microelectronic device, such as, for example, a semiconductor integrated circuit chip. Memory 130 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 130 may comprise other and/or later-developed types of computer-readable memory. Machine readable firmware program instructions may be stored in memory 130. These instructions may be accessed and executed by the integrated circuit 104. When executed by the integrated circuit 104, these instructions may result in the integrated circuit 104 performing the operations described herein as being performed by the integrated circuit.

System 100 may comprise a packet switched network. Switch 102A may be capable of communicating with one or more devices 102B, 102C, 102D . . . 102N using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, switch 102A may be capable of communicating with one or more devices 102B, 102C, 102D . . . 102N using an X.25 communications protocol. The X.25 communications protocol may comply or be compatible with a standard promulgated by the International Telecommunication Union-Telecommunication Standardization Sector (ITU-T). Alternatively or additionally, switch 102A may be capable of communicating with one or more devices 102B, 102C, 102D . . . 102N using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, switch 102A may be capable of communicating with one or more devices 102B, 102C, 102D . . . 102N using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

Ports 0, 1, 2, ..., N may each comprise a client port and/or a stacked port. A port may comprise a physical interface capable of coupling one device to another device. As used herein, a stacked port may be defined as port used to couple a switch to another switch. A client port may be defined as a port used to couple a switch to a network node element, i.e., a device other than a switch. In an embodiment, IC 104 may be capable of routing one or more data packets to another switch coupled to a stacked port and/or another device coupled to client port. "Data packet", as used in any embodiment herein, may comprise a sequence of symbols.

Figure 2:
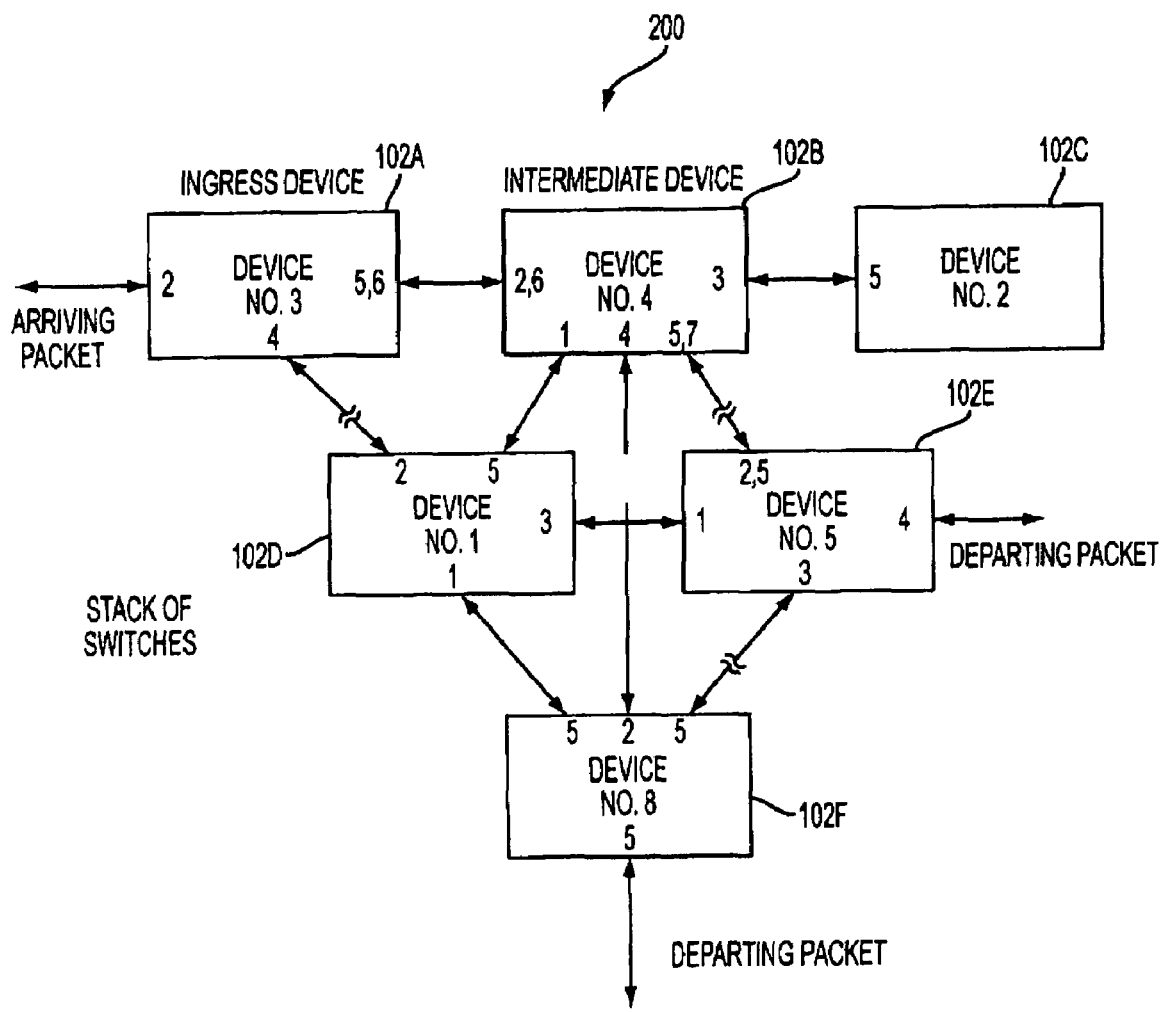
FIG. 2 is a diagram illustrating a plurality of switches in a stacked switch system.

Before describing in detail the particulars of switch 102A and IC 104, a brief overview of stacked switches and transporting data packets among stacked switches is provided below. As stated, switch 102A may be capable of communicating with other switches via one or more stacked ports. A plurality of switches may be coupled together in a stack of switches. FIG. 2 is a diagram illustrating an exemplary switch stack 200. The stack 200 may include a plurality of devices 102A, 102B, 102C, 102D, 102E and 102F, and the stack 200 may represent a complete stacked arrangement of switches or an exemplary subset thereof. The details of switch 102A (depicted in FIG. 1) have been omitted for clarity in FIG. 2. Each of the devices in the stack 200 may be capable of communicating with other switches, either directly or via other switches.

Stacking of switches, such as the stack 200 depicted in FIG. 2, may be operable to bring a plurality of network node elements together, to permit, for example, uniform administration of switches and increased number of available network node elements. The collection of switches (members of the stack) may be administered uniformly via a computer coupled to a client port of one of the switches. The collection of switches depicted in FIG. 2 may operate as a single large switch. It should be understood at the outset that the particular topology of the stack 200 may be formed to support redundancy requirements and/or bandwidth requirements of a particular network environment, and thus, the present disclosure shall be construed as covering any topology of a stack of switches.

Each device in stack 200 may also be capable of communicating with one or more other devices, for example, computer node elements (not shown). For example, an "arriving packet" depicted on Port 2 of switch 102A may be generated by a computer node element. Alternatively or additionally, the "arriving packet" depicted in FIG. 2 may be transmitted by another switch not depicted in stack 200. The "arriving packet" may comprise a multicast data packet. A "multicast data packet", as used in any embodiment herein, for example, may comprise a data packet that is to be replicated and forwarded to more than one device, among a plurality of devices, in the stack 200.

By way of example, the "arriving packet" on port 2 of Switch 102A may comprise a multicast data packet. Switch 102A may be capable of replicating the multicast data packet and routing the multicast data packet by forwarding copies of the multicast data packet, via one or more ports, to one or more switches in the stack 200. As illustrated in FIG. 2, one copy of the multicast data packet may be sent to device 102D via port 4 and device 102B via ports 5 and/or 6. Device 102B may comprise an "intermediate device" which may be defined as a device between two or more devices. Device 102D may also be capable of routing the packet received on port 2 to device 102F (via port 1). Device 102F may be capable routing the packet, labeled "departing packet", via port 5. The departing packet leaving device 102F may be destined for a computer node and/or another switch. Similarly, device 102B may also be capable of routing a copy of the packet to device 102E, via ports 5 and/or 7. Device 102E may be capable of routing the packet, labeled "departing packet, via port 4. The departing packet leaving device 102C may be destined for a computer node and/or another switch. Of course, the preceding description is only provided as an example, and it is intended that the switch 102A of the present disclosure may be capable of routing data packets to one or all of the devices in a stack.

To determine the appropriate port to route a data packet to, switch 102A may comprise a device reachability table (DRAT) 140. FIG. 3 depicts an exemplary DRAT 140 which may be comprised in switch 102A (labeled as "DRAT of Device 3", commensurate with the exemplary stack 200 illustrated in FIG. 2). The DRAT may generally include one or more entries to determine which port or ports, among a plurality of ports comprised in a switch, should be used to reach a target switch in a stack. The first column 302 of the DRAT 140 may include one or more device numbers, for example, device numbers 0 through 8. "Device", as used in reference to the DRAT 140 may include a desired target device in a stack of switches. A plurality of Ways 304 may be defined in the DRAT 140. For example, the DRAT 140 may include Way0, Way1, Way2, . . . , Way11. Each way may designate a port for a target device. For example, row 306 depicts that each of the ways (Way0-Way11) designates port 4 to reach target device 1. Row 308 depicts that Way0-Way5 designates port 5, and Way6-Way11 designates port 6 to reach target device 2. The port or ports designated by each Way (Way0-Way11) may represent a random selection of ports. Alternatively, ports may be designated based on, for example, bandwidth of a port. Thus, for example, in the row for target device 5, port 4 is provided by Way0-Way 9, port 5 is provided by Way10 and port 6 is provided by Way11. This may reflect, for example, a condition in which port 4 of Device 3 has more bandwidth than either ports 5 or 6. If the random number is uniformly distributed over a closed set of random numbers available, uniformity of traffic for any or all ports may be based on bandwidth considerations which may operate to distribute traffic in a more load-balanced arrangement. The number of rows in the DRAT 140 may represent the number of devices in a stack. In this example, device 0, device 6 and device 7 may be unreachable or otherwise unavailable to switch 3, and thus these rows corresponding to these switches may have null entries. In operation, IC 104 may select a port or ports for forwarding a data packet by generate a random number to select a way comprised in DRAT 140.

DRAT 140 may be stored in memory, such as memory 130 or other memory (not shown). IC 104 comprised in switch 102A may be capable of determining the number and/or availability of devices in a stack in which switch 102A is used, and may also be capable of determining the availability and/or performance of one or more ports comprised in switch 102A. IC 104 may be capable of updating and/or creating the DRAT 140 to reflect current conditions in the stack and/or ports of the switch. Alternatively, or additionally, a computer node element coupled to switch 102A may be capable of probing switch 102A and/or one or more devices in a stack in which switch 102A is used, and may determine information to update and/or create DRAT 140. A computer node element may have administrative control over all members in a stack, or subset thereof, and may be capable of updating and/or creating a DRAT associated with other switches in the stack.

Figure 4:
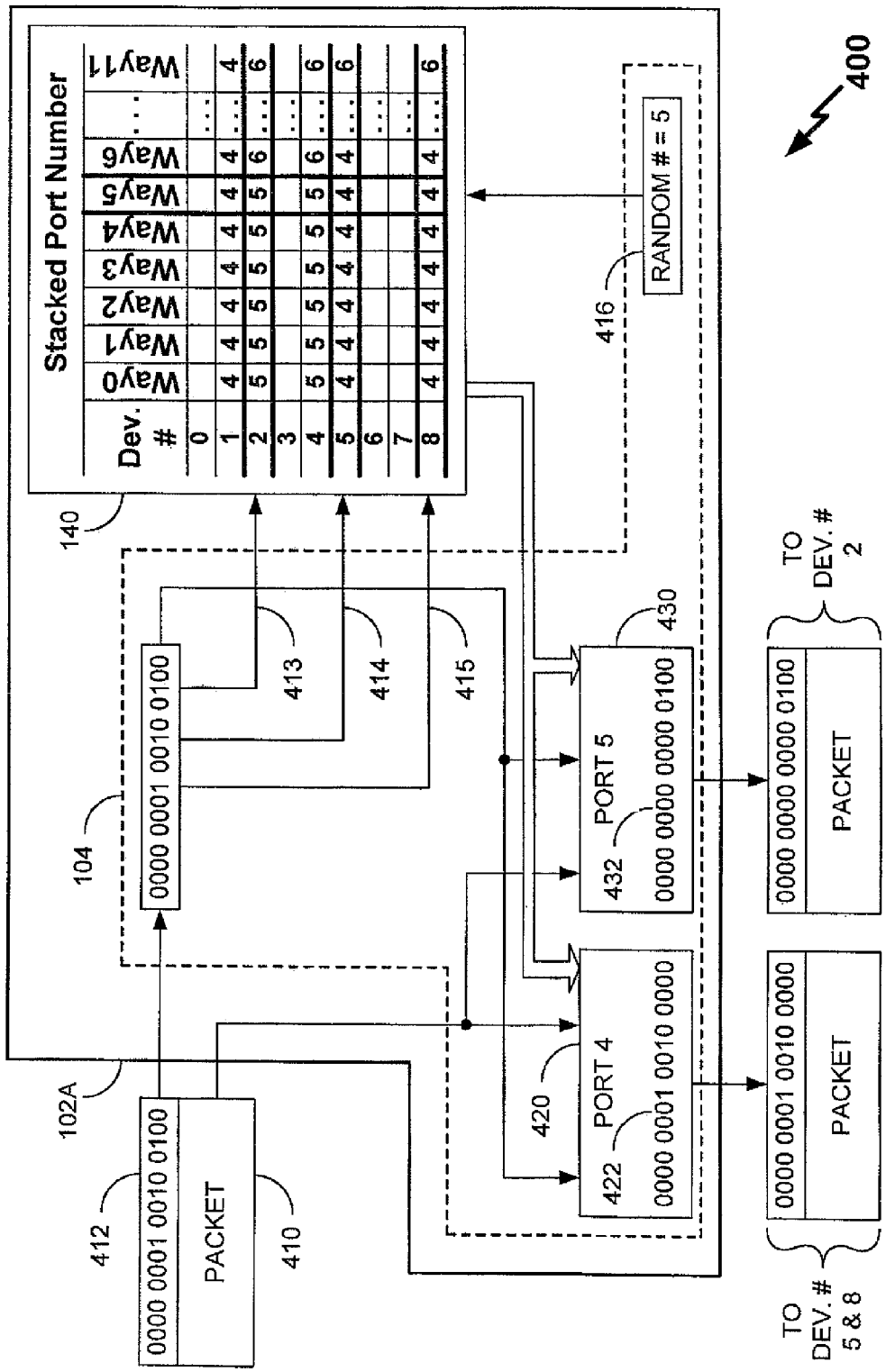
FIG. 4A is a diagram illustrating exemplary operations of an integrated circuit of the system of FIG. 1.
FIG. 4B is a diagram illustrating an integrated circuit of the system of FIG. 1.

FIG. 4A is a diagram illustrating exemplary operations 400 of an integrated circuit 104 of the system of FIG. 1. Referring again to FIGS. 1 and 2, the integrated circuit 104 comprised in the switch 102A may generally be capable of receiving one or more packets from one or more ports comprised in switch 102A, and/or transmitting one or more data packets to one or more ports comprised in switch 102A. In at least one embodiment herein, integrated circuit 104 may be capable of generating one or more device vectors operable to route one or more multicast packets to one or more switches in the switch stack 200. Alternatively, integrated circuit 104 may be capable of receiving one or more device vectors (for example, from other switches in the stack 200) operable to route one or more multicast packets to one or more switches in the switch stack 200. As used herein, "device vector" may be defined as a superset of symbols representing at least one device for which a multicast packet is intended for replication.

In an exemplary embodiment, a master device vector 412 may include a sequence of bits, each bit representing a respective switch in a given stack. The master device vector 412 may specify one or more target devices that should receive a replication of the multicast packet 410 and may represent a superset of all device vectors that may be associated with each replication of the multicast packet 410. The master device vector 412 may originate from another device, such as another switch external to the integrated circuit 104. Alternatively, the integrated circuit 104 may comprise device vector generator circuitry (not shown), which may be capable of generating a device vector 412 to route a multicast data packet 410 to one or more target devices. Based on an identified port number and the master device vector 412, the integrated circuit 104 may be capable generating at least one additional device vector, and may be capable of transmitting the additional device vector and the multicast packet 410 directly to the identified port.

The operations depicted in FIG. 4A may be generally directed to operations of the switch 102A in the switch stack 200 shown in FIG. 2. For the operations of FIG. 4A, assume that the switch 102A receives a multicast packet 410, and that the multicast information provides for a replication of the packet to Devices 2, 5 and 8 in the switch stack 200.

The integrated circuit 104 may generate, or may receive from another source, a master device vector 412 of the form 0000_0001_0010_0100. In this example, each bit in master device vector 412 may represent a device in the switch stack 200. The least significant bit may represent Switch 0, and the most significant bit may represent Switch 15. Thus, in this example, there may be 16 switches in the stack of switches, and Switches 2, 5, and 8 have been selected to receive replications of the packet 410. The integrated circuit 104 (or other circuitry, not shown) may be capable of generating a random number 416. In this example, the random number 416 may comprise a whole number corresponding to the number of Ways defined in the DRAT 140. Thus, for example, the random number 416 may be a whole number from 0 to 11.

Based on the random number 416, the integrated circuit 104 may be capable of generating a port number corresponding to the Way in the DRAT 140. For example, a random number 416 equal to 5 corresponds to Way5 in the DRAT 140. The integrated circuit 104 may select the port corresponding to Way5 in the DRAT 140 for each switch represented in the master device vector 412. In this example, the random number 416 is and bit 2 (413) of the device vector 412 is set, therefore the integrated circuit 104 may select port 5 (430) (corresponding to Way5). Likewise, since bits 5 (414) and 8 (415) of the device vector 412 are set, the integrated circuit 104 may select port 4 (420) to reach both Switch 5 and Switch 8. In this embodiment, the same random number 416 may be used for all operations of the integrated circuit 104 for a given device vector 412.

In this example, an additional device vector may be generated for port 4 (420). Bits 5 (414) and 8 (415) of the device vector 412 may be set (i.e., equal to 1), selecting devices 5 and 8 to receive replications of the packet 410. The integrated circuit 104 may generate a new device vector 422 of the form 0000_0001_0010_0000 (i.e., with bits 5 and 8 set), indicating that the multicast packet may be targeted for devices 5 and 8 via port 4 (420). The multicast packet 410 and the new device vector 422 may be transmitted to devices 5 and 8, via port 4 (420), either directly or through one or more intermediate devices comprised in a stack of switches. If one or more intermediate switches are used, each switch may comprise similar circuitry and operate in a similar manner as described herein with reference to the switch 102A to route the multicast packet to at least one final destination.

An additional device vector may also be generated for port 5 (430). Bit 2 (413) of the device vector 412 may be set, selecting device 2 to receive a replication of the packet 410. The integrated circuit 104 may generate a new device vector 432 of the form 0000_0000_0000_0100, indicating that the multicast packet may be targeted for device 2 via port 5 (430). The multicast packet 410 and the new device vector 432 may be transmitted to device 2 via port 5 (430), either directly or through one or more intermediate devices comprised in a stack of switches. If one or more intermediate switches are used, each switch may comprise similar circuitry and operate in a similar manner as described herein with reference to the switch 102A to route the multicast packet to at least one final destination.

Figure 4B:
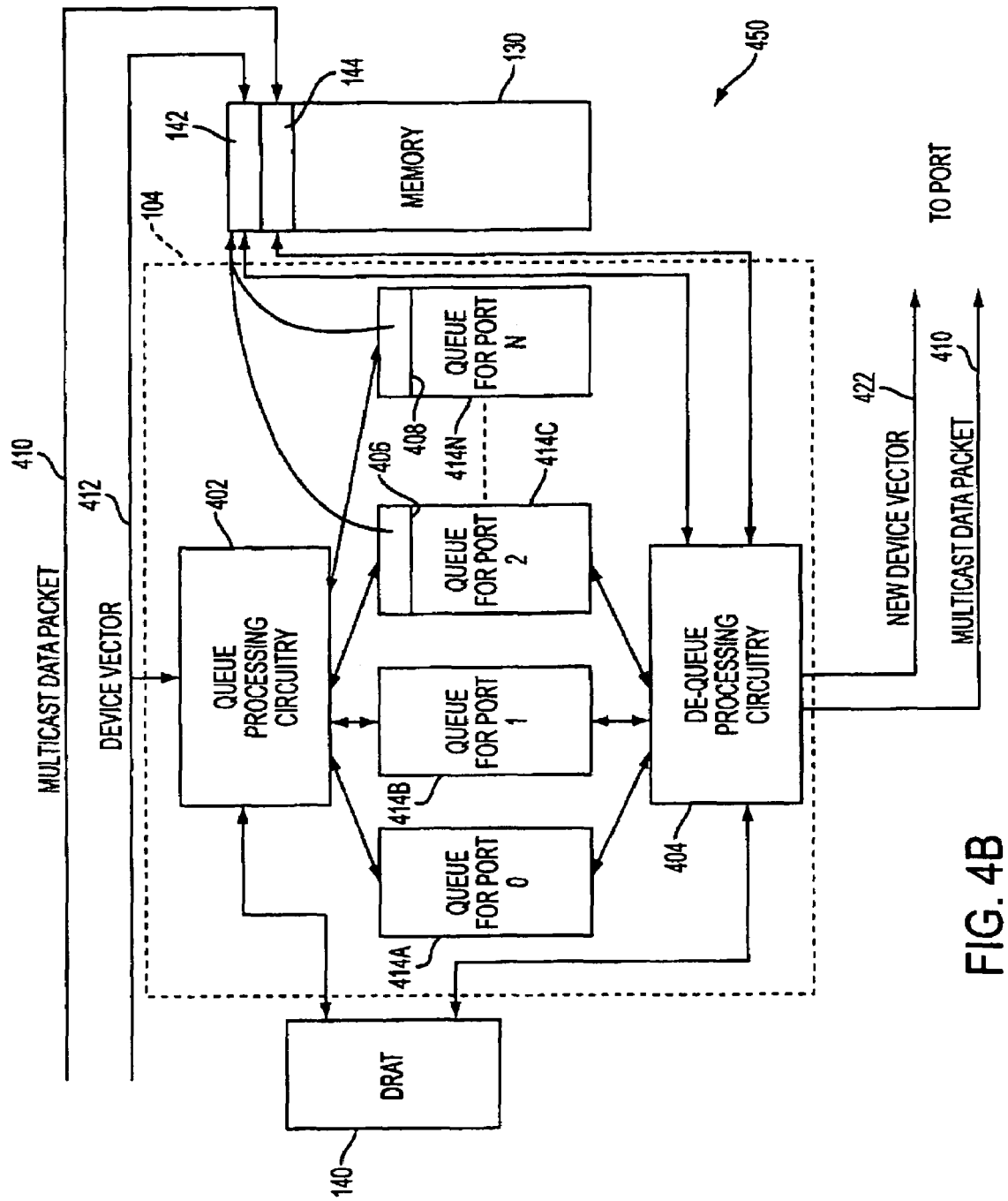

FIG. 4B is a diagram 450 illustrating in more detail an exemplary integrated circuit 104 of the switch 102A of FIGS. 1 and 2. The integrated circuit (IC) 104 may generally be capable of receiving one or more data packets from one or more ports (comprised in switch 102A) and/or transmitting one or more data packets to one or more ports (comprised in switch 102A). IC 104 may also be capable of receiving a multicast data packet and storing the multicast data packet and a master device vector 412 in memory. When a port is available to transmit data, IC 104 may also be capable of de-queueing the master device vector 412 and multicast data packet from memory, generating at least one additional device vector, based at least in part on the master device vector, and transmitting the data packet and the additional device vector to one or more external devices via the port. In an exemplary embodiment, IC 104 may be capable of generating one or more device vectors using de-queue processing circuitry (as will be described below), which may be operable to generate one or more device vectors at a post-memory processing stage, i.e., without requiring additional device vectors to be stored in memory.

The IC 104 may receive a multicast data packet 410 and a master device vector 412. The master device vector 412 may specify one or more target devices that should receive a replication of the multicast data packet 410. The master device vector 412 may represent a superset of all device vectors that may be associated with each replication of the multicast data packet 410. The device vector 412 may originate from another device, such as another switch external to IC 104. Alternatively, IC 104 may comprise device vector generator circuitry (not shown), which may be capable of generating a master device vector 412 to route a multicast data packet 410 to one or more target devices. The master device vector 412 and multicast data packet 410 may be queued in memory 130, at memory locations 142 and 144, respectively.

Referring briefly again to FIG. 1, each replication of the multicast data packet may routed one ore more target devices via a plurality of port 0, 1, 2, . . . , N. A multicast data packet departing on any port may include an associated device vector to appropriately route the multicast data packet on a given port to one or more target devices. Referring again to FIG. 4, IC 104 may comprise port queues 414A, 414B, 414C, . . . , 414N associated with each port 0, 1, 2, . . . , N comprised in switch 102A. Although port queue memory may be comprised in IC 104, it is equally contemplated herein that port queue memory may be comprised in memory 130, or collectively or individually at other memory locations not shown in the drawings.

IC 104 may comprise queue processing circuitry 402 capable of processing a master device vector 412 to determine, at least in part, at least one port to use to forward a multicast data packet 410 to another device. Queue processing circuitry 402 may also be capable of queuing a master device vector 412 and an associated multicast data packet 410 into memory. "Circuitry", as used in any embodiment herein, may comprise, for example, singly or in any combination, hardwired circuitry, programmable circuitry, state machine circuitry, and/or firmware that stores instructions executed by programmable circuitry. Queue processing circuitry 402 may be capable of processing a master device vector 412 to determine which device or devices, among a plurality of devices, is designated by the master device vector 412 to forward the multicast data packet 410. For a given device, queue processing circuitry may be capable of reading the DRAT 140 to determine which port (or ports) may be used to reach the device or devices. Once a port is determined, queue processing circuitry 402 may be capable of writing a pointer into one or more port queues. For example, queue processing circuitry 402 may determine that port 2 and port N may be used to reach a particular device or devices. Queue processing circuitry 402 may write a pointer 406 in the queue for port 2 (414C) and a pointer 408 in the queue for port N (414N). Pointers 406 and 408 may point to the location 142 in memory 130 which may store the device vector 412.

De-Queue processing circuitry 404 may be capable of determining if a port is available to transmit data. If a port is available, de-queue processing circuitry 404 may be capable of reading the port queue memory for a port 414A, 414B, 414C, . . . , 414N and discovering a pointer therein. De-Queue processing circuitry 404 may read the master device vector 412 and the data packet 410 from a location in memory 130 pointed to by one or more pointers in port queue memory, for example, locations 142 and 144, respectively. Based on the port number identified when a port queue memory is read, and the master device vector 412, de-queue processing circuitry 404 may be capable generating at least one new device vector 422. De-Queue processing circuitry may be capable of transmitting the new device vector 422 and the multicast data packet 410 directly to the identified port, i.e., without storing the new device vector 422 in memory 130.

Figure 5A:
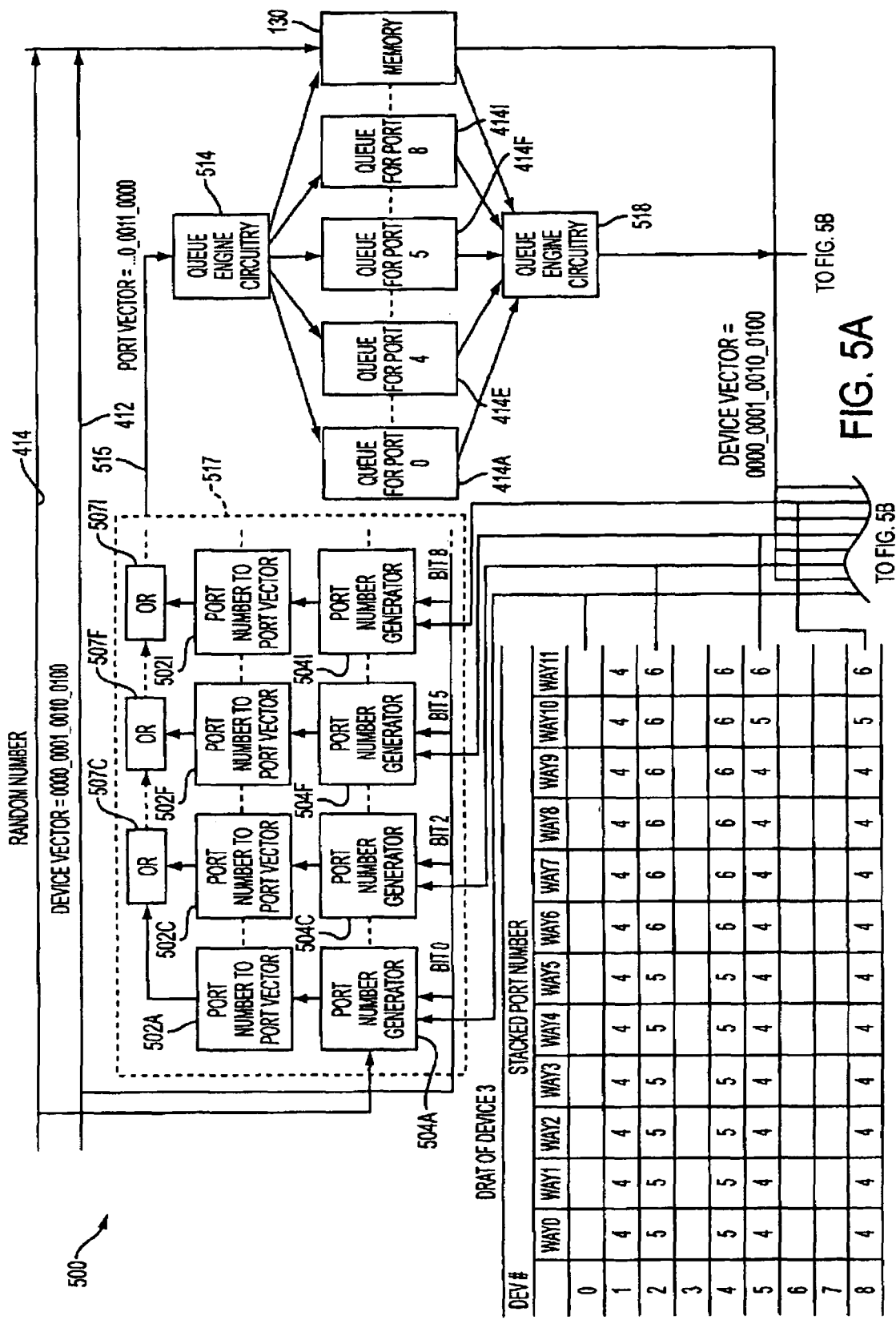
FIG. 5A is a diagram illustrating exemplary operations and exemplary circuitry of the integrated circuit of FIG. 4.
Figure 5B:
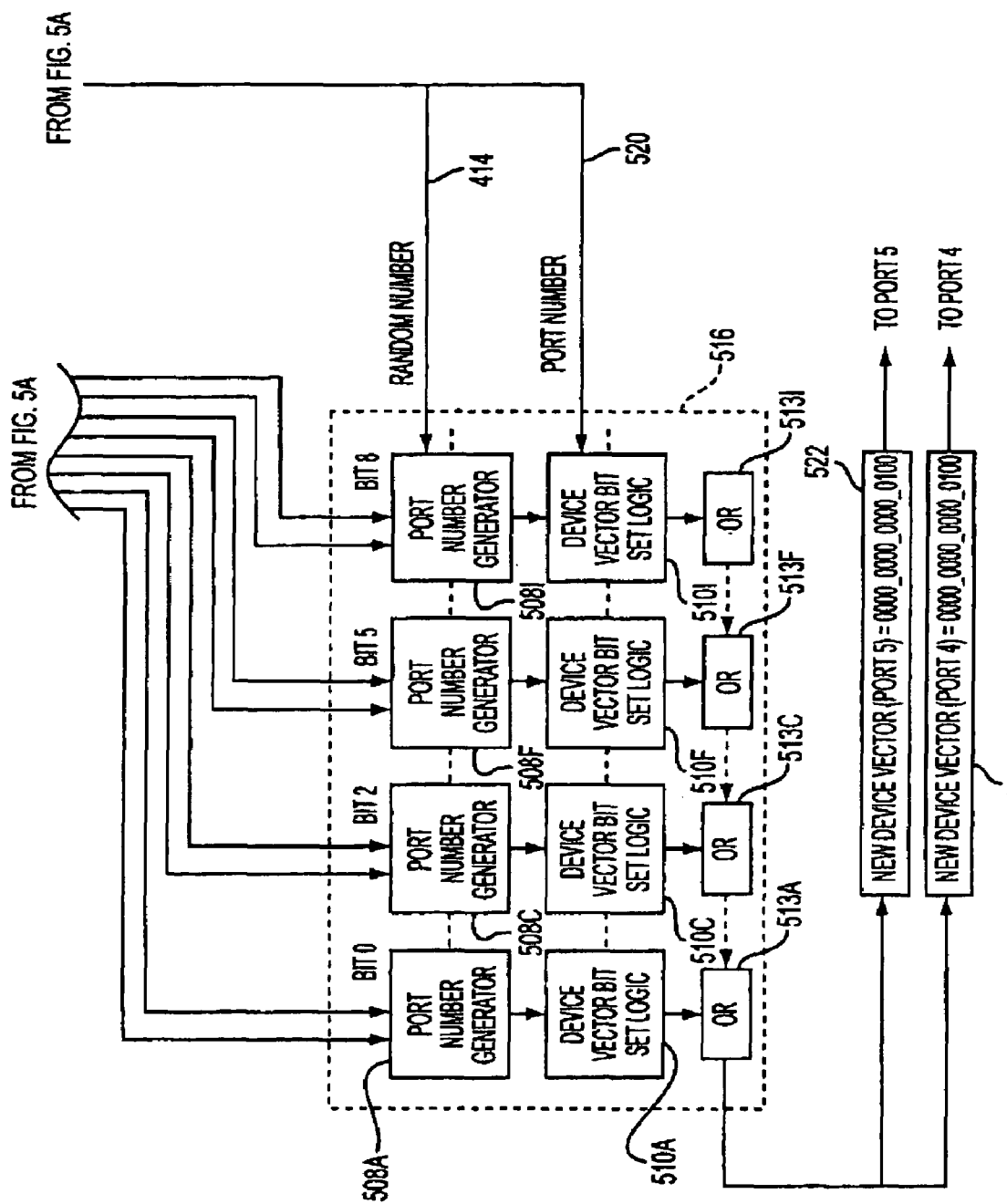
FIG. 5B is a continuation of the diagram of FIG. 5A.

FIGS. 5A and 5B illustrate in more detail exemplary operations and exemplary circuitry 500 of the IC 104 of FIGS. 4A and 4B. The operations of FIGS. 5A and 5B continue the examples of FIGS. 4A and 4B (and thus, continued reference may be made to these figures), and are generally directed to operations of switch 102A in stack 200. For the circuitry and operations thereof of FIGS. 5A and 5B, assume that switch 102A receives a multicast data packet, and that the multicast information provides for a replication of the data packet to Devices 2, 5 and 8 in the switch stack 200 (for example, by including a device vector so specifying).

IC 104 may generate, or may receive from another source, a master device vector 412 of the form 0000_0001_0010_ 0100. In this example, each bit in device vector 412 may represent a device in the stack, such as switch stack 200. The least significant bit may represent Switch 0, and the most significant bit may represent Switch 15. Thus, in this example, there may be 16 switches in a stack of switches. The master device vector 512 may be queued (e.g., stored) in memory 130. IC 104 (or other circuitry, not shown) may be capable of generating a random number 414. In this example, random number may comprise a whole number which corresponds the number of ways defined in the DRAT 140. Thus, for example, random number 414 may be a whole number from 0 to 11. The random number 414 may also be stored in memory 130.

Queue processing circuitry 402 may comprise primary device vector forwarding engine (PDVFE) circuitry 517 and queue engine circuitry 412. The master device vector 412 and the random number 414 may be used as inputs to the PDVFE circuitry 517. PDVFE 517 may be capable of processing each bit of the master device vector 412 in parallel to generate a plurality of intermediate port vectors, in a manner described below.

PDVFE 517 may include port number generator circuitry 504A, . . . 504C, . . . , 504F, . . . 504I, . . . for each bit in the master device vector 412. FIG. 5A only depicts port number generator circuitry for bits 0, 2, 5 and 8, however, it should be understood that PDVFE 517 may comprise similar circuitry for each bit in the device vector 412. Port number generator circuitry may be capable of reading a corresponding row in the DRAT 140. Thus, for example, port number generator circuitry 504C. which may correspond to bit 2 in the device vector 412, which in turn may correspond to switch 2 in the stack, may be capable of reading, at least in part, the row of data in the DRAT 140 corresponding to switch 2. Based on the random number 512, port number generator circuitry may be capable of generating a port number corresponding to the way in the DRAT 140. For example, assuming that the random number is 5, this number corresponds to Way5 in DRAT 140. Port number generator circuitry may select the port corresponding to Way5 in the DRAT for each switch represented in the device vector 412.

Accordingly, port number generator circuitry 504A may be capable of reading the row in the DRAT 140 corresponding to switch 0. Since, in this example, switch 0 may be unreachable or otherwise unavailable to switch 102A (Switch 3), that row may comprise null entries. Thus, port number generator circuitry 504A may generate a null value port number. Also, since in this example bit 0 of the device vector 412 is not set (i.e., bit 0=0), port number generator circuitry 504A may generate a null or 0 value. Port number circuitry 504C may be capable of reading the row in the DRAT corresponding to switch 2. In this example, the random number 414 is 5 and bit 2 of the device vector 412 is set, therefore port number generator circuitry 504C may select port 5 (corresponding to Way5). Likewise, port number generator 504F may select port 4, and port number generator circuitry 504I may select port 4. In this embodiment, the same random number 512 may be used for all operations of the PDVFE 517 for a given device vector 511.

Port number to port vector circuitry 502A, . . . , 502C, . . . , 502F, . . . , 502I, . . . may be capable of generating a plurality of intermediate port vectors, based on the port number as may be generated for each bit in the device vector 412. A port vector may comprise a sequence of bits, each representing a port comprised in switch 102A. Thus, for example, if switch 102A includes 26 ports, each intermediate port vector may be 26 bits long. In this example, since port number generator circuitry 504A generated a null or 0 port number, port number to port vector circuitry 502A may generate an intermediate port vector having no bits set. Since port number generator circuitry 504C generated a port number of 4, port number to port vector circuitry 502C may generate an intermediate port vector of the form . . . 0_0001_0000, where the least significant bit represents port 0 of switch 102A, and port 4 includes a set bit (i.e., bit 4=1). Similarly, and continuing this example, port number to port vector circuitry 502F may generate an intermediate port vector of the form . . . 0_0001_0000. Likewise, since port number generator circuitry 504I generated a port number of 5, port number to port vector circuitry 502I may generate an intermediate port vector of the form . . . 0_0010_0000, indicating that port 5 includes a set bit.

Each of the intermediate port vectors which may be generated by each of the port number to port vector circuitry may be combined to generate port vector 515. In one embodiment, intermediate port vectors may be OR'd together, to generate a single port vector 515. To that end, DVFE circuitry 512 may comprise OR circuitry 507C, . . . , 507F, . . . , 507I, . . . which may be capable of ORing two or more port vectors, resulting in the single port vector 515. The result of the OR operations, as may be performed by OR circuitry, may generate a port vector 515 of the form . . . 0_0011_0000, indicating that ports 4 and 5 may be used to transport the multicast data packet to other switches in the stack.

Queue engine circuitry 408 may be capable of receiving port vector 515 and generating one or more pointers. In this example, a pointer may be placed in the port queue memory for port 4 (406E) and the port queue memory for port 5 (406F), corresponding to the set bits comprised in the exemplary port vector 515. The pointer in queue 406E and 406F may point to the location in memory 130 which holds a device vector 412.

De-Queue processing circuitry 404 may comprise secondary device vector forwarding engine (SDVFE) circuitry 516 and de-queue engine circuitry 412. The device vector 511, the random number 512, and a port number may be used as inputs to the SDVFE circuitry 516. SDVFE 516 may be capable of processing each bit of the device vector 412 in parallel to generate a new device vector, in a manner described below. De-Queue engine circuitry 518 may be capable of discovering if one or more ports, among the plurality of ports in switch 102A, is available to transmit a multicast data packet. If a port is available, de-queue circuitry 518 may be capable of reading the port queue memory for that port, reading a pointer comprised in port memory, and de-queuing a port number, the multicast data packet, the random number 512 and the device vector 511 to SDVFE circuitry 516 (FIG. 5B).

Referring now to FIG. 5B, SDVFE 516 may include port number generator circuitry 508A, . . . 508C, . . . , 508F, . . . 508I, . . . for each bit in the device vector 511. Port number generator circuitry 504A, . . . 504C, . . . , 504F, . . . 504I, . . . comprised in PDVFE 517 may operate in a manner similar to port number generator circuitry 508A, . . . 508C, . . . , 508F, . . . 508I, . . . comprised in SDVFE 516. FIG. 5B only depicts port number generator circuitry for bits 0, 2, 5 and 8, however, it should be understood that SDVFE 516 may comprise similar circuitry for each bit in the device vector 511. Port number generator circuitry may be capable of reading a corresponding row in the DRAT 140. Thus, for example, port number generator circuitry 508C. which may correspond to bit 2 in the device vector 412, which in turn may correspond to switch 2 in the stack, may be capable of reading, at least in part, the row of data in the DRAT 140 corresponding to switch 2. Based on the random number 414, port number generator circuitry may be capable of generating a port number corresponding to the way in the DRAT 140. For example, still assuming that the random number 414 is 5, this number corresponds to Way5 in DRAT 140. Port number generator circuitry port number generator circuitry 508A, . . . 508C, . . . , 508F, . . . 508I, . . . may select the port corresponding to Way5 in the DRAT for each switch represented in the device vector 412.

Accordingly, port number generator circuitry 508A may be capable of reading the row in the DRAT 140 corresponding to switch 0. Since, in this example, switch 0 is unreachable or otherwise unavailable to switch 102A (Switch 3), that row may comprise null entries. Thus, port number generator circuitry 508A may generate a null value port number. Also, since in this example bit 0 of the device vector 412 is not set (i.e., bit 0=0), port number generator circuitry 508A may generate a null or 0 value. Port number circuitry 508C may be capable of reading the row in the DRAT corresponding to switch 2. In this example, the random number 414 is 5 and bit 2 of the device vector 412 is set, therefore port number generator circuitry 508C may select port 5 (corresponding to Way5). Likewise, port number generator 508F may select port 4, and port number generator circuitry 504I may select port 4. In this embodiment, the same random number 414 may be used for all operations of the SDVFE 516 for a given master device vector 412.

Device vector bit set logic circuitry 510A, . . . , 510C, . . . , 510F, . . . , 510I, . . . may be capable of generating a plurality of intermediate device vectors based on the port number 520, as may be determined by de-queue circuitry 518 and the port number generated by port number generator circuitry 508A, . . . 508C, . . . , 508F, . . . 508I, . . . , and as may be generated for each bit in device vector 412. Device vector bit set logic circuitry 510A, . . . , 510C, . . . , 510F, . . . , 510I, . . . may be capable of determining an equality between port number 520 and the port number generated by each respective port number generator circuitry 508A, . . . 508C, . . . , 508F, . . . 508I, . . . When a match occurs between these two numbers, device vector bit set logic circuitry 510A, . . . , 510C, . . . , 510F, . . . , 510I, . . . may set a corresponding bit in an intermediate device vector generated therein. Taking first a new device vector that may be generated for port 4, for bits 5 and 8 the port number generator circuitry 508F and 508I each generated a port number of 4 (described by way of example above). Since, in this example, port number 520 is 4 (i.e., generating a new device vector for port 4), device vector bit set bit circuitry 510F and 510I may generate respective intermediate device vectors having bits 5 and 8 set (i.e., bit 5=1, bit 8=1), respectively. In this example, no other match exists between a port number generated by the remaining port number generator circuitry and the port number 520, and thus, device intermediate vectors generated in the remaining device vector bit set logic circuitry may comprise all unset bits (i.e., all 0).

Each of the intermediate device vectors which may be generated by each of the device vector bit set logic circuitry 510A, . . . , 510C, . . . , 510F, . . . , 510I, . . . may be combined to generate the new device vector. In one embodiment, intermediate device vectors may be OR'd together, to generate a single new device vector 524. To that end, DVFE circuitry 516 may comprise OR circuitry 513A . . . 513C, . . . , 513F, . . . , 513I, . . . which may be capable of ORing two or more intermediate device vectors, resulting in the single device vector 524 for port 4. The result of the OR operations, as may be performed by OR circuitry, may generate a new device vector 524 of the form 0000_0001_0010_0000, indicating that the multicast data packet is targeted for devices 5 and 8 via port 4. The multicast data packet (which may be queued in port queue memory for port 4) and the new device vector 524 may be transmitted to devices 5 and 8, via port 4, either directly or through one or more intermediate devices comprised in a stack of switches. If one or more intermediate switches are used, each switch may comprise similar circuitry and operate in a similar manner as described herein with reference to switch 102A to route the multicast data packet to at least one final destination.

Taking now a new device vector 522 that may be generated for port 5, for bit 2 the port number generator circuitry 508C generated a port number of 5 (described by way of example above). Since, in this example, port number 520 is 5 (i.e., generating a new device vector for port 5), device vector bit set bit circuitry 510C may generate an intermediate device vector having bit 2 set (i.e., bit 2=1). In this example, no other match exists between a port number generated by the remaining port number generator circuitry and the port number 520, and thus, intermediate device vectors generated in the remaining device vector bit set logic circuitry may comprise all unset bits (i.e., all 0).

As with the example for port 4, each of the device vectors which may be generated by each of the device vector bit set logic circuitry 510A, . . . , 510C, . . . , 510F, . . . , 510I, . . . may be combined to generate a new device vector. In one embodiment, intermediate device vectors may be OR'd together, to generate a single new device vector 522. The result of the OR operations, as may be performed by OR circuitry, may generate a new device vector 522 of the form 0000_0000_0000_0100, indicating that the multicast data packet is targeted for device 2 via port 5. The multicast data packet (which may be queued in queue memory for port 5) and the new device vector 522 may be transmitted to device 2, via port 5, either directly or through one or more intermediate devices comprised in a stack of switches. If one or more intermediate switches are used, each switch may comprise similar circuitry and operate in a similar manner as described herein with reference to switch 102A to route the multicast data packet to at least one final destination.

Figure 6:
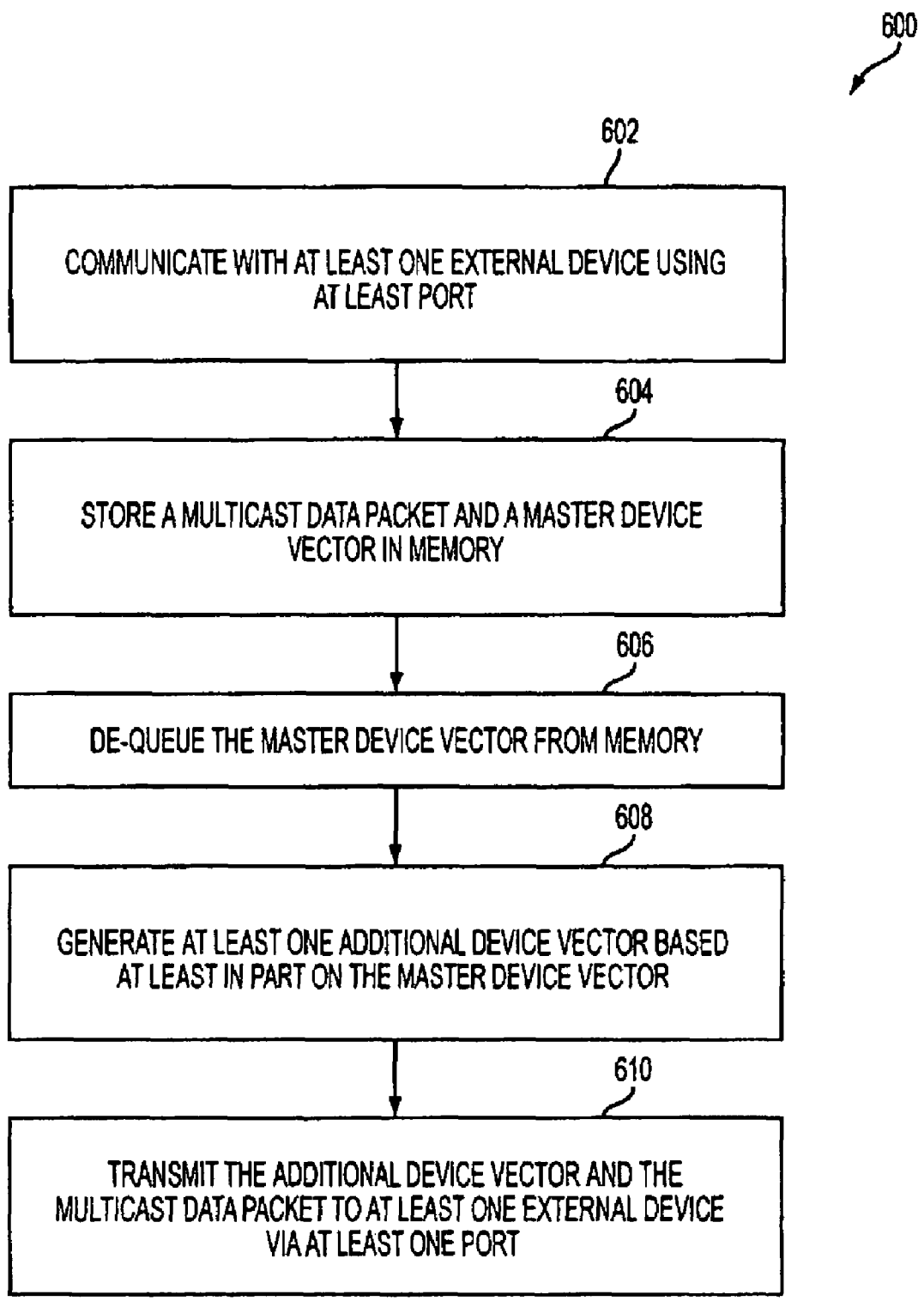
FIG. 6 is a flowchart illustrating exemplary operations according to an embodiment.

FIG. 6 illustrates exemplary operations 600 which may be performed according to an embodiment. Operations may include communicating with at least one external device using at least one port 602. Operations may also include storing a multicast data packet and a master device vector in memory 604. The multicast data packet may comprise a data packet destined for multiple locations, for example, multiple locations to and/or through a stack of switches. The master device vector may be received with the multicast data packet, or may be generated based on routing information comprised in the multicast data packet. Operations may also include de-queueing the master device vector from memory 606. Operations may also generating at least one additional device vector based at least on part on the master device vector 608. Operations may also include transmitting the additional device vector and the multicast data packet to at least one external device via at least one port 610.

Thus, in summary, one apparatus embodiment may include an integrated circuit (IC) capable of communicating with at least one external device using at least one port. The IC may also be capable of receiving a multicast data packet and storing the multicast data packet and a master device vector in memory. The IC may also be capable of de-queueing the master device vector from memory, generating at least one additional device vector based at least in part on the master device vector, and transmitting the multicast data packet and at least one additional device vector to at least one external device via at least one port.

At least one system embodiment may include a switch capable of communicating with one or more external switches using a plurality of ports. The switch may comprise an integrated circuit (IC) capable of communicating with at least one external device using at least one port. The IC may also be capable of receiving a multicast data packet and storing the multicast data packet and a master device vector in memory. The IC may also be capable of de-queueing the master device vector from memory, generating at least one additional device vector based at least in part on the master device vector, and transmitting the multicast data packet and at least one additional device vector to at least one external device via at least one port.

The integrated circuit of these embodiments may be capable processing a device vector in a parallel manner, which may operate to increase the speed and data throughput of the device. For example, if the device vector comprises a sequence of bits, each bit in the sequence may be processed simultaneously. Also, the integrated circuit of these embodiments may be capable of generating additional device vectors (for example 522 and 524 in FIG. 5B), based on a master device vector, at a de-queued processing stage. Additional device vectors may be forwarded to a device (or devices) in a stack of devices directly upon being generated, e.g., without requiring intervening memory write operations for the additional device vectors. Thus, memory storage space for at least one new device vector may by reduced or eliminated, since new device vectors may be compressed until generated in de-queue processing circuitry and forwarded to one or more devices. This may provide, for example, on-the-fly generation of additional device vectors without requiring additional memory and without requiring additional memory operations.

If a multicast data packet is destined, at least in part, to a device (e.g. computer node) couple to a port of switch 102A, IC 104 may be capable of transmitting the multicast data packet to that device without generating additional device vectors for that replication.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
an integrated circuit (IC) configured to communicate with at least one external device using at least one port, said IC is also configured to receive a multicast data packet and store said multicast data packet and a master device vector in memory, said master device vector including a sequence of bits, wherein each bit represents a respective said external device, said IC is also configured to de-queue said master device vector from memory, generate a plurality of intermediate device vectors, one said intermediate device vector for each bit in said master device vector, and combine said plurality of intermediate device vectors to generate at least one additional device vector, said IC further configured to transmit said multicast data packet and at least one said additional device vector to at least one said external device via at least one said port.

2. The apparatus of claim 1, wherein:
said IC comprising queue processing circuitry configured to read a device reachability table and generate a port vector, said device reachability table comprising at least one data entry indicating which said port, among a plurality of said ports, for a given said external device, is used by said IC to forward said multicast data packet to said at least one external device, said port vector indicating at least one said port to use to forward said multicast data packet to at least one said external device.

3. The apparatus of claim 2, wherein:
said queue processing circuitry comprising device vector forwarding engine circuitry configured to generate a plurality of intermediate port vectors, one said intermediate port vector for each bit in said device vector, said device vector forwarding engine circuitry further configured to combine said plurality of intermediate port vectors to generate said port vector;
said port vector comprises a sequence of bits, wherein each bit represents a respective said port to use to forward said multicast data packet to said at least one said external device, said queue processing circuitry further comprising port queue circuitry engine configured to write a pointer in at least one port queue associated with at least one said port, said pointer pointing to said master device vector in said memory;
said device vector forwarding engine circuitry configured to process each said bit in said master device vector simultaneously.

4. The apparatus of claim 1, wherein:
said IC comprising de-queue processing circuitry configured to read-a device reachability table, said device reachability table comprising at least one data entry indicating which port, among a plurality of said ports, for a given said external device, is used by said IC to identify said port to transmit said multicast data packet to said at least one external device, said de-queue processing circuitry further configured to generate said additional device vector based on a port number identified in said device reachability table and said master device vector;
said de-queue processing circuitry comprising port de-queue engine circuitry configured to read at least one pointer stored in at least one port queue associated with at least one said port, said pointer pointing to said master device vector in said memory, said de-queue processing circuitry is also configured to de-queue said master device vector from said memory, said de-queue circuitry is also configured to determine which port queue, among said plurality of port queues, stores said pointer;
said device vector forwarding engine circuitry configured to process each said bit in said master device vector simultaneously.

5. The apparatus of claim 1, wherein:
said IC is also configured to directly forward at least one said additional device vector and said multicast data packet to at least one said external device.

6. The apparatus of claim 1, wherein:
said IC is further configured to select at least one port, among said plurality of ports, based on a random number, said random number representing a bandwidth distribution of available bandwidth for a given port among said plurality of ports.

7. A method, comprising:
communicating with at least one external device using at least one port;
storing a multicast data packet and a master device vector in memory, said master device vector including a sequence of bits, wherein each bit represents a respective said external device;
de-queuing said master device vector from memory;
generating a plurality of intermediate device vectors, one said intermediate device vector for each bit in said master device vector, and combining said plurality of intermediate device vectors to generate at least one additional device vector; and
transmitting said multicast data packet and at least one said additional device vector to at least one said external device via at least one said port.

8. The method of claim 7, further comprising:
reading a device reachability table and generating a port vector, said device reachability table comprising one or more data entries indicating which said port, among a plurality of said ports, for a given said external device, is used to forward said multicast data packet to said at least one external device, said port vector indicating at least one said port to use to forward said multicast data packet to said at least one external device;
selecting at least one port, among said plurality of ports, based on a random number, said random number representing a bandwidth distribution of available bandwidth for a given port among said plurality of ports.

9. The method of claim 8, further comprising:
generating a plurality of intermediate port vectors, one said intermediate port vector for each bit in said master device vector;
combining said plurality of intermediate port vectors to generate said port vector;
said port vector comprises a sequence of bits, wherein each bit represent a respective said port to use to forward said multicast data packet to said at least one said external device, said method further comprising:
based on said port vector, writing a pointer, pointing to said master device vector in said memory, in at least one port queue associated with at least one said port;
processing each said bit in said master device vector simultaneously;
determining which port queue, among said plurality of port queues, stores said pointer.

10. The method of claim 7, further comprising:
directly forwarding said second device vector and said multicast data packet to at least one said external device using said port determined by said master device vector.

11. An article, comprising:
a storage medium having stored thereon instructions that when executed by a machine results in the following;
communicating with at least one external devices using at least one port;
storing a multicast data packet and a master device vector in memory, said master device vector including a sequence of bits, wherein each bit represents a respective said external device;
de-queuing said master device vector from memory;
generating a plurality of intermediate device vectors, one said intermediate device vector for each bit in said master device vector, and combining said plurality of intermediate device vectors to generate at least one additional device vector; and
transmitting said multicast data packet and at least one said additional device vector to at least one said external device via at least one said port.

12. The article of claim 11, wherein said instructions that when executed by said machine result in the following additional operations:
reading a device reachability table and generating a port vector, said device reachability table comprising one or more data entries indicating which said port, among a plurality of said ports, for a given said external device, is used to forward said multicast data packet to said at least one external device, said port vector indicating at least one said port to use to forward said multicast data packet to said at least one external device;
selecting at least one port, among said plurality of ports, based on a random number, said random number representing a bandwidth distribution of available bandwidth for a given port among said plurality of ports.

13. The article of claim 12, wherein:
said instructions that when executed by said machine result in the following additional operations:
generating a plurality of intermediate port vectors, one said intermediate port vector for each bit in said master device vector; and
combining said plurality of intermediate port vectors to generate said port vector;
said port vector comprises a sequence of bits, wherein each bit represents a respective said port to use to forward said multicast data packet to said at least one external device, wherein said instructions that when executed by said machine result in the following additional operations:
based on said port vector, writing a pointer, pointing to said master device vector in said memory, in at least one port queue associated with at least one said port;
wherein said instructions that when executed by said machine result in the following additional operations:
processing each said bit in said master device vector simultaneously;
wherein said instructions that when executed by said machine result in the following additional operations:
determining which port queue, among said plurality of port queues, stores said pointer.

14. The article of claim 11, wherein said instructions that when executed by said machine result in the following additional operations:
directly forwarding at least one said additional second device vector and said multicast data packet to at least one said external device using said port determined by said master device vector.

15. A system, comprising:
a switch capable of communicating with at least one external device using a plurality of ports, the switch comprising an integrated circuit (IC) configured to receive a multicast data packet and store the multicast data packet and a master device vector in memory, said master device vector including a sequence of bits, wherein each bit represents a respective said external device, said IC is also configured to de-queue said master device vector from memory and to generate a plurality of intermediate device vectors, one said intermediate device vector for each bit in said master device vector, and combine said plurality of intermediate device vectors to generate at least one additional device vector, said IC further configured to transmit said data packet and at least one said additional device vector to at least one said external device via at least one said port.

16. The system of claim 15, wherein:
said switch comprising a device reachability table comprising at least one data entry indicating which said port, among a plurality of said ports, for a given said external device, is used by said IC to forward said multicast data packet to said at least one external device, said IC comprising queue processing circuitry configured to read said device reachability table and generating a port vector, said port vector indicating at least one said port to use to forward said multicast data packet to said at least one external device;
said IC is further configured to select at least one port, among said plurality of ports, based on a random number, said random number representing a bandwidth distribution of available bandwidth for a given port among said plurality of ports.

17. The system of claim 16, wherein:
said queue processing circuitry comprising device vector forwarding engine circuitry configured to generate said plurality of intermediate port vectors, one said intermediate port vector for each bit in said master device vector, said device vector forwarding engine circuitry further configured to combine said plurality of intermediate port vectors to generate said port vector;
said port vector comprises a sequence of bits, wherein each bit represents a respective said port to use to forward said multicast data packet to said at least one external device, said pre-memory processing circuitry further comprising port queue circuitry configured to write a pointer, pointing to said first device vector in said memory, in at least one port queue associated with at least one said port;
said device vector forwarding engine circuitry configured to process each said bit in said master device vector simultaneously.

18. The system of claim 15, wherein:
said IC comprising de-queue processing circuitry configured to read a device reachability table, said device reachability table comprising at least one data entry indicating which port, among a plurality of said ports, for a given said external device, is used by said IC to identify said port to transmit said multicast data packet to said at least one external device, said de-queue processing circuitry further configured to generate said additional device vector based on a port number identified in said device reachability table and said master device vector;
said de-queue processing circuitry comprising port de-queue engine circuitry configured to read at least one pointer stored in at least one port queue associated with at least one said port, said pointer pointing to said first device vector in said memory, said de-queue processing circuitry is also configured to de-queue said master device vector from said memory, said port de-queue circuitry is also configured to determine which port queue, among said plurality of port queues, stores said pointer;
said device vector forwarding engine circuitry configured to process-each said bit in said master device vector simultaneously;
said IC is also capable of directly forwarding at least one said additional device vector and said multicast data packet to at least one said external device.

* * * * *